(12) United States Patent  (10) Patent No.: US 9,012,354 B2
Cordonier et al.  (45) Date of Patent: Apr. 21, 2015

(54) PHOTOCATALYTIC FILM, METHOD FOR FORMING PHOTOCATALYTIC FILM AND PHOTOCATALYTIC FILM COATED PRODUCT

(75) Inventors: Christopher Cordonier, Nagoya (JP); Tetsuya Shichi, Nagoya (JP); Kenichi Katsumata, Yokohama (JP); Yasuhiro Katsumata, Ichinomiya (JP); Akira Fujishima, Kawasaki (JP); Takafumi Numata, Bondi (AU); Takayoshi Sasaki, Tsukuba (JP)

(73) Assignee: Central Japan Railway Company, Aichi (JP)

( * ) Notice: Subject to any disclaimer, the term of this patent is extended or adjusted under 35 U.S.C. 154(b) by 527 days.

(21) Appl. No.: 12/526,150

(22) PCT Filed: Feb. 8, 2008

(86) PCT No.: PCT/JP2008/052180
§ 371 (c)(1),
(2), (4) Date: Aug. 6, 2009

(87) PCT Pub. No.: WO2008/096866
PCT Pub. Date: Aug. 14, 2008

(65) Prior Publication Data
US 2010/0317512 A1   Dec. 16, 2010

(30) Foreign Application Priority Data

Feb. 8, 2007  (JP) .................................. 2007-029318
Apr. 24, 2007  (WO) .................. PCT/JP2007/058870

(51) Int. Cl.
*B01J 35/00* (2006.01)
*B01J 23/20* (2006.01)
*B01J 37/02* (2006.01)
(Continued)

(52) U.S. Cl.
CPC ................ *B01J 35/004* (2013.01); *B01J 23/20* (2013.01); *B01J 37/0215* (2013.01); *C03C 17/25* (2013.01); *C03C 21/001* (2013.01); *C03C 2217/218* (2013.01); *C03C 2217/228* (2013.01); *C03C 2217/23* (2013.01); *C03C 2217/71* (2013.01); *C03C 2218/111* (2013.01)

(58) Field of Classification Search
None
See application file for complete search history.

(56) References Cited

U.S. PATENT DOCUMENTS 6,103,363 A  8/2000 Boire et al.
7,096,692 B2 *  8/2006 Greenberg et al. ............ 65/60.2

FOREIGN PATENT DOCUMENTS

CN  1793036  6/2006
EP  1074525 A1  7/2001
(Continued)

OTHER PUBLICATIONS

Office Action dated Apr. 18, 2011 issued for Korean application No. 10-2009-7016985 with partial English translation attached, 4 pages.
(Continued)

*Primary Examiner* — Melvin C Mays
*Assistant Examiner* — Stefanie Cohen
(74) *Attorney, Agent, or Firm* — James L. Young; Westman, Champlin & Koehler, P.A.

(57) ABSTRACT

Disclosed is a method for forming a photocatalyst thin film, which is characterized in that a photocatalyst thin film containing a niobium-alkali metal complex oxide is formed by forming and then firing a layer containing a niobia nanosheet on the surface of a base containing an alkali metal.

9 Claims, 5 Drawing Sheets (51) Int. Cl.
  *C03C 17/25* (2006.01)
  *C03C 21/00* (2006.01)

(56) References Cited

FOREIGN PATENT DOCUMENTS

| JP | 07-168001 | 7/1995 |
|---|---|---|
| JP | 10-53439 | 2/1998 |
| JP | 10-273319 | 10/1998 |
| JP | 2001-150586 | 6/2001 |
| JP | 2001-303276 | 10/2001 |
| JP | 2003-003113 | 1/2003 |
| JP | 2003260369 A | 9/2003 |
| JP | 2005-290369 | 10/2005 |
| JP | 2006-247652 | 9/2006 |

OTHER PUBLICATIONS

Office Action dated Jun. 15, 2011 issued for Chinese Application No. 200880004598.4 with English translation (7 pages).

International Search Report from priority Japan application No. PCT/JP2008/052180 (2 pages), dated May 20, 2008.

Form PCT/IB/338 (Transmittal) and Form PCT/IPEA/409 (International Preliminary Report on Patentability) from corresponding application PCT/JP2008/052180 filed Feb. 8, 2008, mailed Oct. 15, 2009, 5 pages.

Ikeda S et al., "Effect of the particle size for photocatalytic decomposition of water on Ni-loaded K4Nb6O17", Microporous Materials, Elsevier Science BV, Amsterdam, NL, vol. 9, No. 5-6, May 1, 1997, pp. 253-258, XP026971114, ISSN: 0927-6513.

Unal U et al., "Visible light photoelectrochemical activity of K4Nb6O17 intercalated with photoactive complexes by electrostatic self-assembly deposition", Journal of Solid State Chemistry, Orland FL, US, vol. 179, No. 1, Jan. 1, 2006, pp. 33-40, XP024951927, ISSN: 0022-4596, DOI: 10.1016/J.JSSC.2005.09.038.

Zhong T et al., "Synthesis and characterization of layered niobate K4Nb6O17 thin films by niobium-chelated precursor", Journal of Crystal Growth, Elsevier, Amsterdam, NL, vol. 285, No. 1-2, Nov. 15, 2005, pp. 201-207, XP027850879, ISSN: 0022-0248.

Extended European Search Report (including supplementary European Search Report and European Search Opinion) dated May 21, 2014 for corresponding European Application No. EP 08 71 1059 (9 pages).

\* cited by examiner

PHOTOCATALYTIC FILM, METHOD FOR FORMING PHOTOCATALYTIC FILM AND PHOTOCATALYTIC FILM COATED PRODUCT

CROSS-REFERENCE TO RELATED APPLICATION

This Application is a Section 371 National Stage Application of International Application No. PCT/JP2008/052190, filed Feb. 8, 2008 and published as WO 2008/096871 on Aug. 14, 2008, not in English. This Application and International Application No. PCT/JP2008/052190 claim priority to JP 2007-029318, filed Feb. 8, 2007 and PCT/JP2007/058870, filed Apr. 24, 2007.

TECHNICAL FIELD

The present invention is related to a photocatalytic film and a product including the photocatalytic film.

BACKGROUND

Specifically, the photocatalytic self-cleaning products can decompose fouling by ultraviolet light present in the spectrum of sunlight and also wash off fouling on surfaces of the products by the super-hydrophilic property when rain falls. Therefore, the products are able to constantly maintain clean appearance (self-cleaning function).

There are several problems concerning photocatalyst coated self-cleaning glass among the photocatalytic self-cleaning products. In general, photocatalyst coated self-cleaning glass is produced by coating a surface of the glass with particles of titanium oxide (TiO2). Since a contact area between the titanium oxide particles and the glass surface is small, a coating layer is easily worn off. Adhesion between the coating layer and the glass can be improved if firing is conducted at high temperature of several hundreds centigrade after the coating layer is formed. In that case, however, photocatalytic activity is decreased. Specifically, since soda-lime glass that is widely used for a window contains a considerable amount of sodium ion, the sodium ion is diffused into the coating layer at the surface of the glass during the firing. As a result, a compound of titanium oxide and sodium (like sodium titanate) is formed and the photocatalytic property of the glass is lost.

Figure 2:
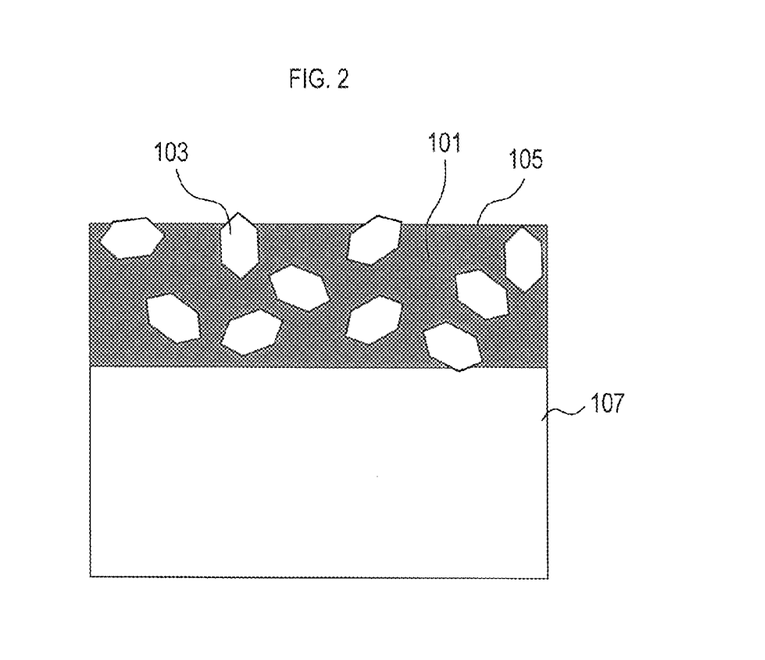
FIG. 2 is a diagram showing the photocatalytic film formed by a room temperature curing method.

To avoid such problem of photocatalytic performance loss due to alkali diffusion, two methods are taken in manufacturing of photocatalytic self-cleaning glass. One of the methods is called a room temperature curing method. In the method, fine particles of titanium oxide photocatalysts are mixed into a coating liquid that contains sol-gel components and is solidified at comparatively low temperature. The resulted mixture is applied to glass and solidified at around 150° C. (see Patent Document 1, for example). According to this method, as shown in FIG. 2, a photocatalytic film 105 in which fine particles 103 of titanium oxide is diffused in a sol-gel film 101 is formed on a surface of a glass base 107.

Figure 3:
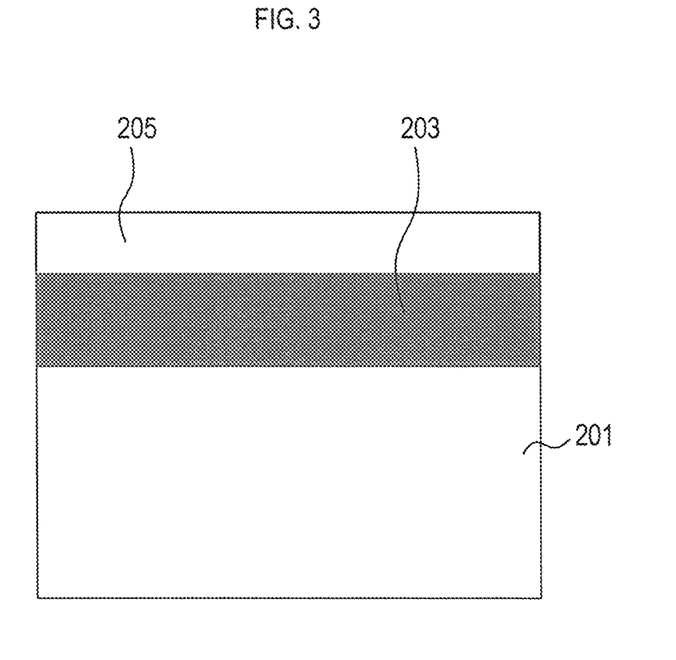
FIG. 3 is a diagram showing the photocatalytic film formed by a two-layer coating method.

The other of the methods is called a two-layer coating method. In this method, as shown in FIG. 3, an undercoating film 203 containing a component like silica (SiO₂) is formed on a surface of a glass base 201 in order to inhibit alkali diffusion from the glass base 201 due to firing. Thereafter, photocatalytic coating is performed to form and then fire a photocatalytic film 205 (see Patent Document 2, for example).

A similar problem exists in glazed ceramic products and enameled metal products. Glaze and enamel are liquid glasses which are melted or dissolved in a medium. Since glaze and enamel includes a massive amount of sodium components in order to lower a melting point thereof, the room temperature curing method or the two-layer coating method has to be used in order to form a photocatalytic film on a surface of these products.

Patent Document 1: Unexamined Japanese Patent Publication No. 2001-150586
Patent Document 2: Unexamined Japanese Patent Publication No. 10-53439

In the room temperature curing method, since adhesion between glass and a coating film is not high, abrasion resistance of the film is low. This method can only be adopted for very limited use, such as in a part where there is little physical contact with others (like a window of a tall building, for example).

In the two-layer coating method, coating has to be performed twice. In addition, according to circumstances, the undercoating film also requires firing. In that case, firing steps have to be conducted twice. Cumbersome steps and high costs become necessary.

SUMMARY

The present invention is made in consideration of the above problems. The purpose is to provide a method for forming a photocatalytic film by which a photocatalytic film having high adhesion strength to a base and high durability can be formed in few steps. The purpose is also to provide such photocatalytic film and a product including such photocatalytic film.

Means for Solving the Problem

In a method for forming a photocatalytic film according to a first aspect of the present invention which was made to solve the above problems, a photocatalytic film containing niobium-alkali metal complex oxide is formed by forming and then firing at a temperature of 450° C. or higher, a layer containing niobia nanosheet on a surface of a base containing alkali metal.

According to the above method for forming a photocatalytic film, a photocatalytic film having high adhesion strength to a base and high durability can be formed in few steps.

According to the method for forming a photocatalytic film in the first aspect, it is assumed that the photocatalytic film is formed as follows. Specifically, a layer containing niobia nanosheet is formed and fired at a temperature of 450° C. or higher on the surface of the base containing alkali metal. Alkali metal contained in the base is then separated out onto the surface of the base to be diffused into the layer at the surface containing niobia nanosheet. Reaction involving alkali metal and niobia nanosheet occurs, and thus, a photocatalytic film containing niobium-alkali metal complex oxide is formed on the surface of the base.

Figure 1:
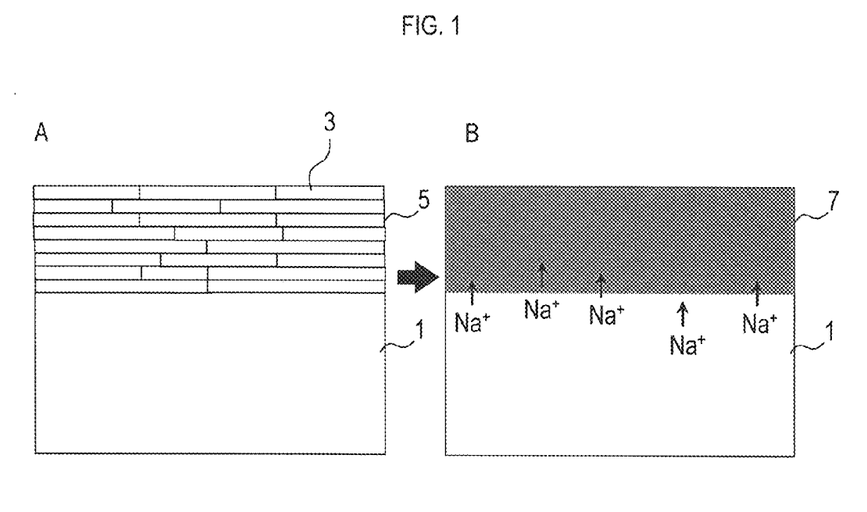
FIG. 1 is a diagram that explains how reaction involving soda-lime glass and niobia nanosheet occurs and a photocatalytic film containing niobium-sodium compound oxide is formed on a surface of the soda-lime glass.

For example, as shown in a A part of FIG. 1, a layer 5 containing niobia nanosheet 3 is formed and fired at a temperature of 450° C. or higher on a surface of soda-lime glass 1 containing sodium. Then, as shown in a B part of FIG. 1, sodium contained within the soda-lime glass 1 is heated to be separated out onto the base 1 and diffused into the layer containing niobia nanosheet. Reaction involving sodium and niobia nanosheet occurs, and thus, a photocatalytic film 7 containing niobium-sodium complex oxide (NaNbO₃, for example) is formed on the surface of the soda-lime glass 1.

In other words, in the method for forming a photocatalytic film according to the first aspect, alkali metal contained in the base, which has been the cause for deteriorating photocatalytic performance, is consciously utilized to form a photocatalytic film containing niobium-alkali metal complex oxide on the surface of the base. The niobium-alkali metal complex oxide exhibits significant photocatalytic activity. Also, since the photocatalytic film containing niobium-alkali metal complex oxide formed by the above-described forming method is fired at a temperature of 450° C. or higher, the photocatalytic film has a high degree of hardness and is superior in durability since adhesion strength to the base is high.

The reasons why adhesion strength between the photocatalytic film formed by the above-described forming method in the first aspect of the present invention and the base is high are because:
  (i) particles of niobium oxide are brought into contact with the surface of the base in a very broad area owing to use of the niobia nanosheet;
  (ii) direct chemical reaction between the alkali component in the base and niobium oxide due to firing brings the interface between the surface of the base and the film together, and thus, high adhesion strength is exhibited; and
  (iii) niobia nanosheet hardly expands or shrinks in a longitudinal direction, that is, a direction parallel to the surface of the base, upon chemical change by firing. Thus, no exfoliation from the base and crack of the film occur. High adhesion strength can be achieved.

In addition, since the photocatalytic film formed by the above-described forming method in the first aspect of the present invention is formed using flat and smooth niobia nanosheet, it is hard for contaminant to adhere to and transparency of the film is high.

The niobia nonosheet is niobium oxide having a scale-like shape. The size is preferably in a range of 0.1-50 μm. The thickness is preferably in a range of 0.3-3 nm, more preferably 0.5-1 nm. An aspect ratio of the niobia nanosheet is preferably in a range of 100-100000.

In the method for forming a photocatalytic film according to the first aspect of the present invention, a layer containing niobia nanosheet on the surface of the base containing alkali metal may be formed by a liquid phase coating method which uses a coating liquid such as a niobia nanosheet dispersion prepared by exfoliating layered niobium oxide by a parting agent.

As for the liquid phase coating method, a liquid phase coating method ordinarily used can be applicable, such as spin coat method, dip coat method, spray coat method, roll coat method, blade coat method, bar coat method, flow coat method, and so on.

In the liquid phase coating method, it is preferable that the layer containing niobia nanosheet is formed by applying a coating agent containing niobia nanosheet (the second aspect of the present invention).

In this way, the layer can be formed in a simple manner of applying a coating agent containing niobia nanosheet to the surface of the base. There is no necessity of large-scale equipment required like in sputtering and other methods. The photocatalytic film containing niobium-alkali metal complex oxide can be formed at low cost. A proportion of the niobia nanosheet in the coating agent is preferably in a range of 0.05-10 weight %.

As for the niobia nanosheet, $Nb_3O_8-$, $Nb_6O_{17}-$ and others can be used which can be obtained from materials such as $KNb_3O_8$, $K_4Nb_6O_{17}$ and others which are layered niobate compounds. Ion exchange is conducted by acid treatment so that these layered niobate compounds are converted to compounds like $H_3NbO_8$, $H_4Nb_6O_{17}$ and others. Thereafter, a parting agent is applied. Then, a layered structure is exfoliated and a nanosheet dispersion can be obtained. As for the parting agent, tetrabutylammonium ion, quaternary ammonium ion such as tetraethylammonium, tetramethylammonium and others, and amines such as diethanolamine, triethanolamine and others can be utilized.

There are various bases containing alkali metal. In either of the above-described inventions of the first to the fourth aspects, the base containing alkali metal may be soda-lime glass (in the case of a third aspect of the present invention), a glassy film formed on a surface of a ceramic ware by glazing (in the case of a fourth aspect of the present invention), or a glassy film formed on a surface of a metal product by enameling (in the case of a fifth aspect of the present invention). These bases contain sodium which is alkali metal. Thus, when layers containing niobia nanosheet are formed and fired on surfaces of the bases, sodium is separated out and diffused into the layers. Reaction involving sodium and niobium then occurs thereby to form a film containing niobium-sodium complex oxide ($NaNbO_3$, for example) or a film containing tantalum-sodium complex oxide ($NaTaO_3$, for example) on the surface of the bases.

As noted above, since soda-lime glass which is mass produced and used as ordinary glass, and generally used glaze and enamel, can be a base, the photocatalytic film can be formed at low cost.

For example, if the glass base on which a photocatalytic film is formed is a hardened glass or a curved glass, manufacturing processes of these glasses originally includes a glass heating step. Thus, if coating is performed before the heating step, the heating step serves as the firing step of a photocatalytic film. Accordingly, there is no need to provide a firing step of a photocatalytic film anew.

In either of the inventions according to the first to the fifth aspects, if the firing temperature is 500-550° C. (in the case of a sixth aspect of the invention), remarkable photo-induced super-hydrophilic activity and also remarkable photocatalytic activity are exhibited. Specifically, separation of sodium ion is optimum at the temperature of 500-550° C. Thus, hydrophilic activity and photocatalytic activity are further enhanced.

A photocatalytic film according to a seventh aspect of the present invention is a photocatalytic film formed by the method for forming a photocatalytic film set forth in any of the inventions according to the first to the sixth aspects of the present invention.

The photocatalytic film in the seventh aspect of the present invention has high degree of hardness and excellent durability. Since niobium-sodium complex oxide is formed, the film has both super-hydrophilic property and photocatalytic activity, and a self-cleaning function as well. In addition, since the film is formed using niobia nanosheet, the film is highly smooth and it is hard for contaminant to adhere to the film.

A photocatalytic film according to an eighth aspect of the present invention is a photocatalytic film set forth in the seventh aspect of the present invention, wherein an average surface roughness of the film is equal to or lower than 5 nm. The photocatalytic film is specifically excellent in surface smoothness. Thus, it is especially hard for contaminant to adhere to the film.

The average surface roughness of the photocatalytic film according to the eighth aspect of the present invention can be set between the average surface roughness of the base itself and 5 nm. The average surface roughness of the glass base is generally around 0.5 nm. In this case, the average surface roughness of the photocatalytic film according to the eighth aspect of the present invention is practically between 0.5-5 nm. The average surface roughness of the photocatalytic film according to the eighth aspect of the present invention can be controlled, for example, by changing the exfoliation state of the niobia nanosheet when forming the photocatalytic film. For example, if a strong parting agent (for example, a tetrabutylammonium hydroxide (TBAOH) solution used in later-described Embodiment 2) is used when exfoliating the niobia nanosheet, exfoliation of the niobia nanosheet proceeds, resulting in that the surface roughness of the photocatalytic film becomes small. On the other hand, if a weak parting agent (for example, 3-methoxypropylamin (3-MPA) used in later-described Embodiment 3) is used when exfoliating the niobia nanosheet, the niobia nanosheet is not completely exfoliated and a state is generated such that a few layers are laminated in the coating solution. As a result, the surface roughness of the photocatalytic film becomes relatively large.

A photocatalytic film-coated product according to a ninth aspect of the present invention is a photocatalytic film-coated product including a base containing alkali metal and the photocatalytic film set forth in the seventh or eighth aspect of the present invention provided on a surface of the base.

In the photocatalytic film-coated product, the photocatalytic film has a high degree of hardness and is superior in durability since adhesion strength to the base is high. Also, since the photocatalytic film-coated product includes the photocatalytic film made from niobium-sodium complex oxide, the photocatalytic film-coated product has both super-hydrophilic property and photocatalytic activity. The product is also superior in self-cleaning function. Moreover, since the photocatalytic film has high smoothness, it is hard for contaminant to adhere to the film.

Accordingly, in case that the base is glass, the glass can be stain-resistant and maintain transparency for a long term. In case that the base is a mirror, the mirror can be stain-resistant and maintain reflectivity for a long term. Moreover, in case that the base is a glazed ceramic product, the ceramic product can maintain its surface constantly clean. Also in case that the base is an enameled product, the enameled product can maintain its surface constantly clean.

EXPLANATION OF REFERENCE NUMERALS

1, 107, 201 . . . glass base 3 . . . niobia nanosheet 5, 105, 205 . . . photocatalytic film 103 . . . fine particle of titanium oxide 203 . . . undercoating film

DETAILED DESCRIPTION

The present invention is described based on embodiments.
Embodiment 1
(a) Preparation of Coating Liquid 42.61 g (160.3 mmol) of powdery niobium oxide ($Nb_2O_5$) and 7.39 g (53.2 mmol) of potassium carbonate ($K_2CO_3$) were dispersed in 150 ml of a mixed solvent (50 ml of ethanol and 100 ml of n-hexane) and mixed for 24 hours by a zirconia ball in a ball mill. Then, the solvent was removed by centrifugation. The remaining powder was dried and grinded in a mortar. The grinded powder was moved into a crucible made of alumina and fired for 30 hours at 1100° C. During the firing, the firing temperature was increased to 1100° C. in 3 hours and 40 minutes. The crucible was naturally cooled off.

The obtained potassium niobate ($KNb_3O_8$) was grinded in a mortar. While the grinded potassium niobate was stirred in 6 M of a nitric acid aqueous solution, ion exchange was conducted for 24 hours. Then, the nitric acid was removed by centrifugation. New nitric acid was added and ion exchange was conducted in the same manner. Ion exchange by nitric acid was conducted 4 times in total. By the ion exchanges, niobia nanosheet made from niobium oxide was generated. Thereafter, using purified water instead of nitric acid, the niobia nanosheet was washed four times in the same manner as in the ion exchange. To a dispersion liquid where the washed niobia nanosheet was dispersed in water, 40 wt % of a tetrabutylammonium hydroxide solution and a suitable amount of ethanol were added such that the proportion of water and ethanol became 25:75 thereby to obtain a coating liquid having a solid content concentration of 0.25 wt %.

(b) Formation of Photocatalytic Films

The prepared coating liquid was applied onto a surface of each base made of soda-lime glass (50 mm×50 mm) by dip coat method. The lifting speed in dip coat method was set to be 8 mm/sec. Thereafter, the soda-lime glass base was fired for 1 hour in atmospheric air to complete the photocatalytic film Temperature control during the firing was performed such that the temperature was increased to a predetermined firing temperature in 1 hour, maintained at the temperature for 1 hour, and cooled down to room temperature in 1 hour. The predetermined firing temperature was set for 11 kinds in total, every 50° C. in a range of 300-400° C. and 450-600° C. and every 10° C. in a range of 400-450° C. Thereby, 11 kinds of photocatalytic films respectively having a different firing temperature were formed.

Embodiment 2
(c) Preparation of Coating Liquid

Powdery niobium oxide ($Nb_2O_5$) and potassium nitrate ($KNO_3$) were thoroughly mixed. The mixture proportion of niobium oxide and potassium nitrate was set to be 2:3 (mole ratio). Thereafter, the mixed powder was moved into a crucible made of alumina and temporarily fired for 2 hours at 600° C. Subsequently, the temporarily fired powder was grinded and mixed, moved into the crucible made of alumina and fired for 20 hours at 900° C. The obtained potassium niobate ($KNb_3O_8$) was grinded. After ion exchange was conducted for 24 hours while the grinded potassium niobate was stirred in 1.0 M of a nitric acid aqueous solution, the grinded potassium niobate was washed with purified water. This operation was performed four times in total. To a dispersion liquid where the niobia nanosheet obtained as such was dispersed in water, a suitable amount of tetrabutylammonium hydroxide (TBAOH) solution was added such that the proportion of water and ethanol became 25:75. Thereby, a coating liquid having a solid content concentration of 0.25 wt % was obtained.

(d) Formation of Photocatalytic Films

The coating liquid prepared in the above was applied onto a surface of each base made of soda-lime glass (50 mm×50 mm) by spin coat method. The rotation frequency in spin coat method was set to be 1000 rpm, which was maintained for 20 seconds. Thereafter, the soda-lime glass base was fired for 1 hour in atmospheric air to complete the photocatalytic film Temperature control during the firing was performed such that the temperature was increased to a predetermined firing temperature in 1 hour, maintained at the temperature for 1 hour, and cooled down to room temperature in 1 hour. The predetermined firing temperature was set to 350, 400, 450, 500, 550 or 600° C. Thereby, a total of 6 kinds of photocatalytic films respectively having a different firing temperature were formed.

Embodiment 3

(e) Preparation of Coating Liquid

Powdery niobium oxide ($Nb_2O_5$) and potassium nitrate ($KNO_3$) were thoroughly mixed. The mixture proportion of niobium oxide and potassium nitrate was set to be 2:3 (mole ratio). Thereafter, the mixed powder was moved into a crucible made of alumina and temporarily fired for 2 hours at 600° C. Subsequently, the temporarily fired powder was grinded and mixed, moved into the crucible made of alumina and fired for 20 hours at 900° C. The obtained potassium niobate ($KNb_3O_8$) was grinded. After ion exchange was conducted for 24 hours while the grinded potassium niobate was stirred in 1.0 M of a nitric acid aqueous solution, the grinded potassium niobate was washed with purified water. This operation was performed four times in total. To a dispersion liquid where the niobia nanosheet obtained as above was dispersed in water, a suitable amount of 3-methoxypropylamine (3-MPT) was added such that the proportion of water and ethanol became 25:75. Thereby, a coating liquid having a solid content concentration of 0.25 wt % was obtained.

(f) Formation of Photocatalytic Films

The prepared coating liquid was applied onto a surface of each base made of soda-lime glass (50 mm×50 mm) by spin coat method. The rotation frequency in spin coat method was set to be 1000 rpm, which was continued for 20 seconds. Thereafter, the soda-lime glass base was fired for 1 hour in atmospheric air. Temperature control during the firing was performed such that the temperature was increased to 500° C. in 1 hour, maintained at the temperature for 1 hour, and cooled down to room temperature in 1 hour.

Since the photocatalytic films formed in Embodiments 1, 2 and 3 have the above-described microstructure, it is possible to make the films thinner than films having a structure where spherical particles are dispersed.

Moreover, the photocatalytic films formed in Embodiments 1, 2 and 3 are formed using niobia nanosheet. The niobia nanosheet is large in surface area per unit volume and has a large contact area with the soda-lime glass base. Thus, adhesion strength to the soda-lime glass is high. Accordingly, the photocatalytic films formed in Embodiments 1, 2 and 3 have high adhesion strength to the soda-lime glass base.

COMPARATIVE EXAMPLE 1

(g) Preparation of Coating Liquid Containing Titania Nanosheet

Cesium carbonate and titanium oxide were mixed in a mole ratio of 1:5.3, and fired twice, each time for 20 hours at 800° C. To the generated cesium titanate, a series of steps of stirring in dilute hydrochloric acid, filtering and drying were repeated four times. Thereby, layered titanate was obtained in which cesium ion is replaced with hydrogen ion. To the layered titanate, a tetrabutylammonium hydrochloride solution is added. The mixture was stirred for 14 days to prepare titania nanosheet. The titania nanosheet was suspended in a mixed solvent of 75 vol % ethanol and 25 vol % water. A titania nanosheet (TNS) suspension having a solid content concentration of 0.25 wt % was obtained.

A mixed liquid containing titanium tetraisopropoxide (TTIP) and 17 vol % of polyethylene glycol was prepared. The mixed liquid was added to the TNS suspension such that the mole ratio of TNS and TTIP became 9:1. Thereby, a coating liquid was prepared.

(h) Formation of Photocatalytic Films

The coating liquid prepared in the above (g) was applied onto a surface of each base made of soda-lime glass base (50 mm×50 mm) by dip coat method. The lifting speed in dip coat method was set to be 8 mm/sec. Thereafter, the soda-lime glass base was fired for 1 hour in atmospheric air to complete the photocatalytic film. Temperature control during the firing was performed such that the temperature was increased to 500° C. in 1 hour, maintained at the temperature for 1 hour, and cooled down to room temperature in 1 hour.

COMPARATIVE EXAMPLE 2

(i) Preparation of Coating Liquid

Niobium ethoxide and potassium hydroxide were added to ethanol in a mole ratio of 3:1 to prepare a coating liquid containing 1.0 wt % of $KNb_3O_8$.

(j) Formation of Photocatalytic Films

The coating liquid prepared in the above (i) was applied onto a surface of each base made of silica glass (50 mm×50 mm) by spin coat method. The rotation frequency in spin coat method was set to be 1000 rpm, which was continued for 20 seconds. Thereafter, the silica glass base was fired for 1 hour in atmospheric air to complete a photocatalytic film. Temperature control during the firing was performed such that the temperature was increased to 500° C. in 1 hour, maintained at the temperature for 1 hour, and cooled down to room temperature in 1 hour.

COMPARATIVE EXAMPLE 3

(k) Preparation of Coating Liquid

Niobium ethoxide and potassium hydroxide were added to ethanol in a mole ratio of 3:2 to prepare a coating liquid containing 1.0 wt % of $K_4Nb_6O_{17}$.

(l) Formation of Photocatalytic Films

The coating liquid prepared in the above (k) was applied onto a surface of each base made of silica glass (50 mm×50 mm) by spin coat method. The rotation frequency in spin coat method was set to be 1000 rpm, which was continued for 20 seconds. Thereafter, the silica glass base was fired for 1 hour in atmospheric air to complete a photocatalytic film. Temperature control during the firing was performed such that the temperature was increased to 500° C. in 1 hour, maintained at the temperature for 1 hour, and cooled down to room temperature in 1 hour.

COMPARATIVE EXAMPLE 4

(m) Preparation of Coating Liquid 0.0193 g of sodium hydroxide was dissolved in 10 ml of ethanol to prepare a sodium hydroxide solution. The coating liquid having a solid content concentration of 0.25 wt % prepared in Embodiment 2 was set to be a niobia nanosheet solution used in a later-described step.

(n) Formation of Photocatalytic Films

The sodium hydroxide solution prepared in the above (m) was applied onto a surface of each base made of silica glass (50 mm×50 mm) by spin coat method. Then, the niobia nanosheet solution was applied by spin coat method. The rotation frequency in spin coat method was set to be 1000 rpm, which was continued for 20 seconds. Thereafter, the silica glass base was fired for 1 hour in atmospheric air to complete a photocatalytic film. Temperature control during the firing was performed such that the temperature was increased to 500° C. in 1 hour, maintained at the temperature for 1 hour, and cooled down to room temperature in 1 hour.

COMPARATIVE EXAMPLE 5

(o) Preparation of Coating Liquid 0.14 ml of niobium ethoxide was added and mixed to 10 ml of ethanol to prepare a coating liquid containing 1.0 wt % of $Nb_2O_5$.

(p) Formation of Photocatalytic Films

The coating liquid prepared in the above (o) was applied onto a surface of each base made of soda-lime glass (50 mm×50 mm) by spin coat method. The rotation frequency in spin coat method was set to be 1000 rpm, which was continued for 20 seconds. Thereafter, the soda-lime glass base was fired for 1 hour in atmospheric air. Temperature control during the firing was performed such that the temperature was increased to 500° C. in 1 hour, maintained at the temperature for 1 hour, and cooled down to room temperature in 1 hour.

(Test for Verifying Effect of the Present Invention)

(i) Photo-Induced Hydrophilic Property Test

Ultraviolet light was intermittently irradiated to the photocatalytic films formed in Embodiments 1 and 2 and Comparative Examples 1, 2, 3 and 4, using a black-light blue (BLB) fluorescent lamp. Irradiation intensity of ultraviolet light was 2.4 mW/cm² in Embodiment 1 and Comparative Example 1, and 1.0 mW/cm² in Embodiment 2 and Comparative examples 2, 3 and 4. A contact angle of water on a surface of each photocatalytic film was repeatedly measured before and during the irradiation of ultraviolet light. The results were shown in Tables 1 and 2.

TABLE 1

| | Firing Temperature (° C.) | UV-B Irradiation Time (hr) | | | | | |
|---|---|---|---|---|---|---|---|
| | | 0 | 1 | 2 | 3 | 6 | 24 |
| Embodiment 1 | 300 | 34.3 | 27.1 | 26.2 | 20.4 | 23.6 | 18.3 |
| | 350 | 45.4 | 40.4 | 38.7 | 36.4 | 28.3 | 23.2 |
| | 400 | 32.7 | 29.1 | 27.0 | 27.1 | 25.1 | 23.5 |
| | 410 | 32.1 | 28.3 | 28.1 | 26.1 | 26.7 | 25.3 |
| | 420 | 32.7 | 30.2 | 27.3 | 27.7 | 26.8 | 24.3 |
| | 430 | 25.9 | 20.6 | 19.8 | 20.2 | 18.3 | 11.5 |
| | 440 | 25.7 | 20.8 | 19.3 | 19.3 | 15.7 | 13.1 |
| | 450 | 42.3 | 25.1 | 25.1 | 15.0 | 11.6 | 8.2 |
| | 500 | 37.6 | 21.4 | 21.4 | 13.6 | 11.1 | 6.0 |
| | 550 | 37.9 | 15.7 | 15.7 | 11.7 | 7.7 | 5.6 |
| | 600 | 36.5 | 24.5 | 24.5 | 14.0 | 12.7 | 9.9 |
| Comparative Example 1 | 500 | 49.4 | 53.1 | 53.1 | 53.4 | 45.7 | 34.1 |

TABLE 2

| | Firing Temperature (° C.) | UV-B Irradiation Time (hr) | | | |
|---|---|---|---|---|---|
| | | 0 | 1 | 3 | 6 |
| Embodiment 1 | 350 | 37.9 | 38.1 | 41.0 | 33.9 |
| | 400 | 37.2 | 43.5 | 37.0 | 31.4 |
| | 450 | 36.1 | 17.5 | 13.5 | 7.7 |
| | 500 | 52.9 | 29.1 | 20.6 | 6.4 |
| | 550 | 58.5 | 50.2 | 20.5 | 6.9 |
| | 600 | 58.5 | 54.2 | 24.9 | 9.6 |
| Comparative Example 1 | 500 | 44.9 | 31.2 | 33.8 | 28.0 |
| Comparative Example 2 | 500 | 48.1 | 40.0 | 32.2 | 27.0 |
| Comparative Example 3 | 500 | 32.1 | 27.8 | 21.4 | 15.5 |

As shown in Table 1, in any of the photocatalytic films formed in Embodiment 1, the contact angle was largely decreased by irradiation of ultraviolet light (hydrophilic property was exhibited). Especially, decrease in contact angle in the photocatalytic films formed in Embodiment 1 where the firing temperature was 430° C. or higher was significant. The contact angle was decreased to 20° or lower by about 6-hour irradiation of ultraviolet light. The contact angle was reduced to near 10° by 24-hour irradiation. Similarly, as shown in Table 2, in the photocatalytic films formed in Embodiment 2, hydrophilic property was exhibited by irradiation of ultraviolet light. Hydrophilic property was significantly exhibited especially at the firing temperature of 450° C. or higher.

On the other hand, in the photocatalytic film formed in Comparative Example 1, the contact angle was only decreased to around 35° even after 24-hour irradiation. Also, in Comparative Examples 2 and 3, the contact angle was merely decreased to around 27° even after 6-hour irradiation. In Comparative Example 4, the contact angle was merely decreased to around 15° even after 6-hour irradiation.

From the above results, it was confirmed that, in the photocatalytic films formed by the methods of Embodiments 1 and 2 using niobia nanosheet, hydrophilic property is exhibited without forming an undercoating film between the soda-lime glass and the photocatalytic films. Also, it was verified that the photocatalytic films formed by the methods of Embodiments 1 and 2 using niobia nanosheet exhibit hydrophilic property markedly superior to the potassium niobate films (Comparative Examples 2 and 3) formed using ordinary sol-gel methods and the film formed by the method of Comparative Example 4.

(ii) Change in Crystalline Phase of the Formed Films

Figure 4:
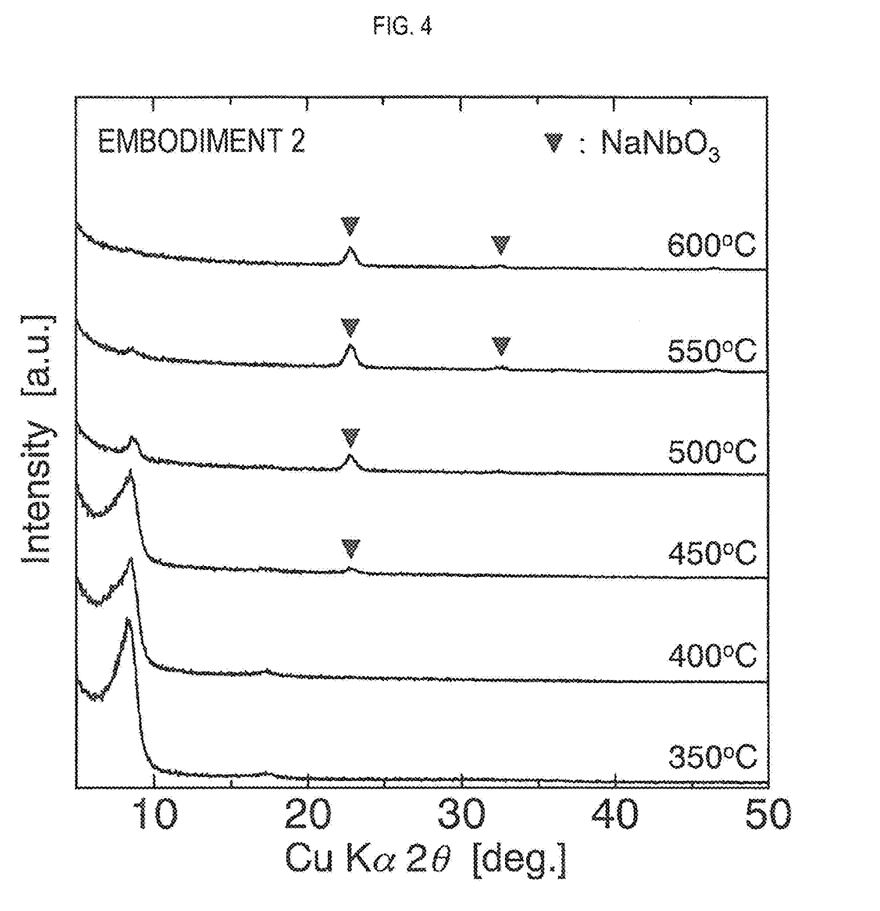
FIG. 4 is a diagram showing an X-ray diffraction pattern of the photocatalytic film.
Figure 5:
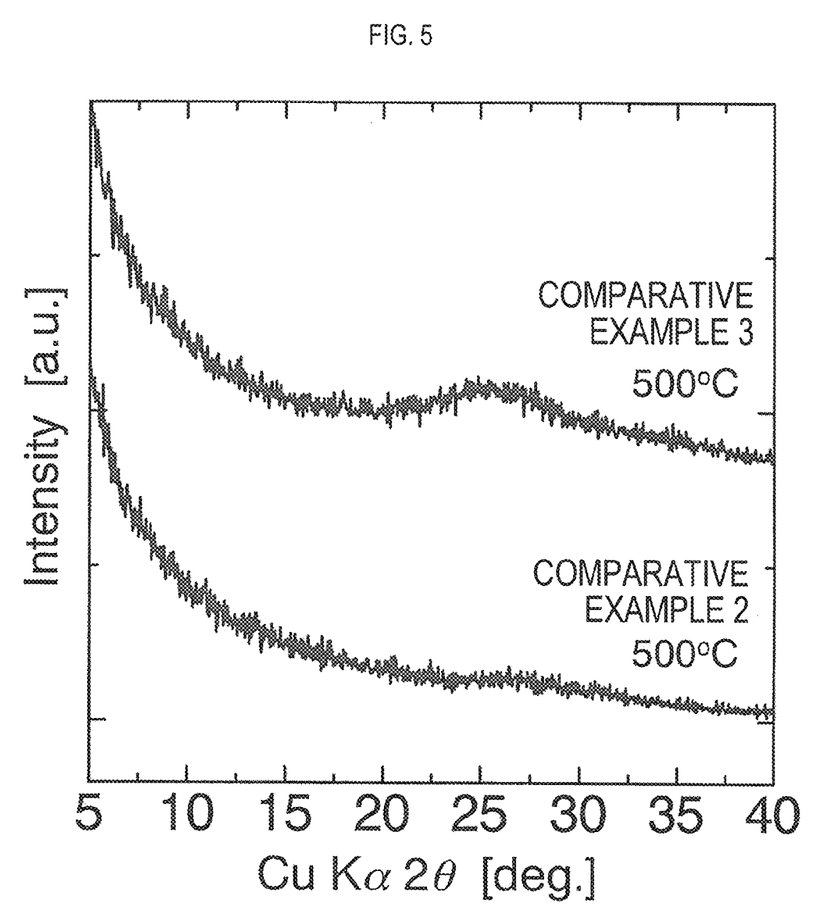
FIG. 5 is a diagram showing an X-ray diffraction pattern of the photocatalytic film.
Figure 6:
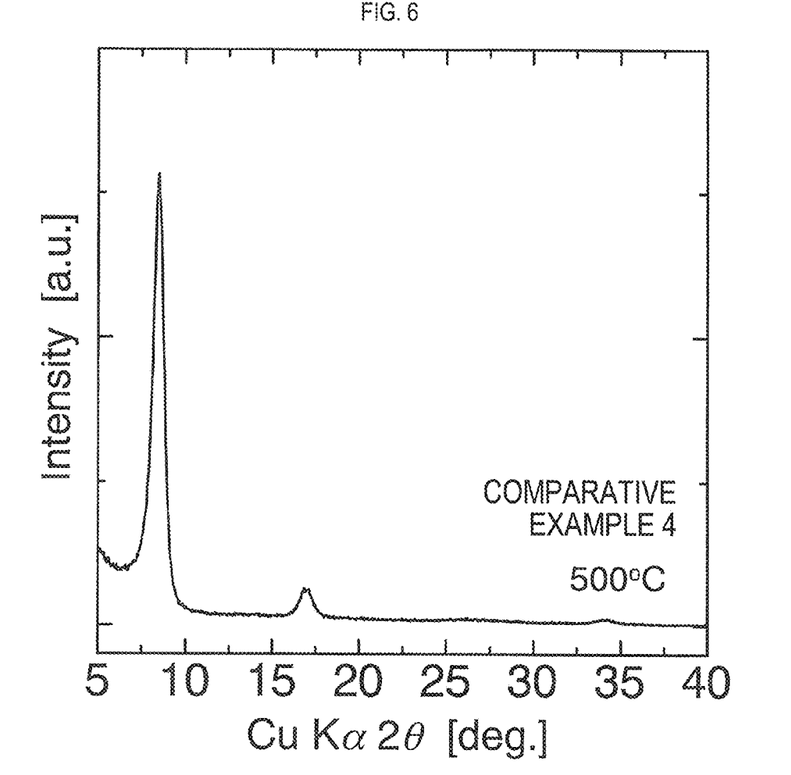
FIG. 6 is a diagram showing an X-ray diffraction pattern of the photocatalytic film.

Crystalline phase of the films formed in Embodiment 2 and Comparative Examples 2, 3 and 4 were identified by a thin film X-ray diffraction device (D8 DISCOVER) produced by Bruker AXS K.K. FIG. 4 shows results for the films formed in Embodiment 2. FIG. 5 shows results for the films formed in Comparative Examples 2 and 3. FIG. 6 shows results for the films formed in Comparative Example 4.

As shown in FIG. 4, in the photocatalytic films formed in the above-described Embodiment 2, diffraction peaks attributed to $NaNbO_3$ were observed during firing at 450° C. or higher.

On the other hand, as shown in FIG. 5, no significant peak was observed in X-ray diffraction patterns for the photocatalytic films formed in Comparative Examples 2 and 3. It was found that potassium niobate is not formed which has photocatalytic activity.

Also, as shown in FIG. 6, only a peak attributed to the layered niobia nanosheet was observed in the photocatalytic film formed in Comparative Example 4. It was found that no compound of niobium and sodium is formed.

While $NaNbO_3$ is generated when niobia nanosheet film is formed and fired on the soda-lime glass base containing alkali metal as in Embodiment 2, potassium niobate having photocatalytic activity is not generated by forming films containing $KNb_3O_8$ and $K_4Nb_6O_{17}$ on the silica glass base containing little alkali metal. From the above results, it was confirmed that by directly forming and firing the niobia nanosheet film on the surface of the base containing sodium, the niobia nanosheet and sodium ion diffused from the base chemically react to each other, thereby forming a compound of niobium-sodium oxide having photocatalytic activity.

Also, as in Embodiment 2, $NaNbO_3$ is generated if the niobia nanosheet film is formed and fired on the soda-lime glass base containing alkali metal (sodium), while, as in Comparative Example 4, $NaNbO_3$ is not generated even if a layer containing sodium is formed by applying a sodium hydroxide solution to the silica glass containing little alkali metal. From the above results, it was found that a base containing sodium is preferable as a sodium source for forming a compound of niobium and sodium.

(iii) Pencil Scratch Test

Hardness of the photocatalytic films formed in the above-described Embodiment 1 and Comparative Examples 1, 2, 3 and 4 were tested pursuant to Pencil Scratch Test of JIS K 5400. The results were shown in Tables 3 and 4.

TABLE 3

| Firing Temperature (° C.) | Embodiment 1 | | | | | | |
|---|---|---|---|---|---|---|---|
| | 300 | 350 | 400 | 450 | 500 | 550 | 600 |
| Hardness | <6B | <6B | <6B | 9H< | 9H< | 9H< | 9H< |

TABLE 4

| | Comparative Example 1 | Comparative Example 2 | Comparative Example 3 | Comparative Example 4 |
|---|---|---|---|---|
| Firing Temperature (° C.) | 500 | 500 | 500 | 500 |
| Hardness | 9H< | 3H | HB | <6B |

The photocatalysts formed in Embodiment 1 showed hardness of 9H or higher when the firing temperature was 450° C. or higher. Although the photocatalyst formed in Comparative Example 1 showed hardness of 9H or higher, hardness of the photocatalysts formed in Comparative Examples 2, 3 and 4 were respectively 3H, HB, and 6B or lower. From the results above, it was confirmed that, since the photocatalytic film formed using niobia nanosheet are brought into contact with the base in a large area and chemical reaction directly occurs to the base and the coating film, the photocatalytic film exhibits significantly high coating hardness as compared to the films of Comparative Examples 2 and 3 formed by sol-gel method.

(iv) Surface Roughness and Initial Antifouling Property

In order to show that the photocatalytic film formed by the method of the present invention is highly smooth and thereby excellent in initial antifouling property, the following test was performed to the photocatalytic films formed in Embodiment 2 and 3 and Comparative Example 5. Surface roughness was evaluated using a scanning probe microscope (manufactured by JEOL Ltd.: JSPM-5200). Also, evaluation of initial anti-fouling property was conducted using methylene blue (MB), that is, a model substance for fouling, as follows. A methylene blue solution was prepared such that the concentration thereof became 0.1 mM. A glass chip on which the above-described photocatalytic film was formed was soaked in the solution for 12 hours. After washing the raised sample, absorption spectrum of methylene blue adhered to the coating was measured by an ultraviolet visible spectrophotometer (manufactured by Hitachi High-Technologies Corporation: U-3310). Table 5 shows a relation between measured arithmetic average surface roughness and the absorption area of methylene blue.

TABLE 5

| Sample Name | Surface Roughness [nm] | MB Absorption Capacity [abs. × nm] |
|---|---|---|
| Embodiment 2 | 2.33 | 1.41 |
| Embodiment 3 | 4.13 | 1.57 |
| Comparative Example 5 | 13.6 | 1.90 |

It is found that, as compared to the photocatalytic film formed in Comparative Example 5, the photocatalytic films formed in Embodiments 2 and 3 are small in value of surface roughness and smooth. Also, the absorption capacity of methylene blue was larger in the photocatalytic film having larger surface roughness formed in Comparative Example 5, as compared to the photocatalytic films having smaller surface roughness formed in Embodiments 2 and 3. From the results, it was confirmed that the photocatalytic film formed according to the present invention is excellent in initial antifouling property, that is, it is hard for fouling to adhere to, since the surface of the film is smooth.

(v) Surface Roughness Measurement of the Niobia Nanosheet Film

The photocatalytic film formed on the glass according to the method of the present invention has high smoothness. This is considered because the coating film also has high smoothness and maintains its shape after the firing since the niobia nanosheet itself has a thickness of only about 1 nm. Accordingly, surface roughness of the niobia nanosheet itself was checked. Niobia nanosheet film was formed on a silicon wafer, using a coating liquid equivalent to that of Embodiment 2. Average surface roughness Ra was measured using a probe microscope. Drop coat method was used as the coating method. As the probe microscope, SPI 3800/SPA 400 manufactured by SII Nano Technology Inc. was used. Tapping mode was used for the measurement mode, and Si cantilever (20 $Nm^{-1}$) was used as a cantilever.

Figure 7:
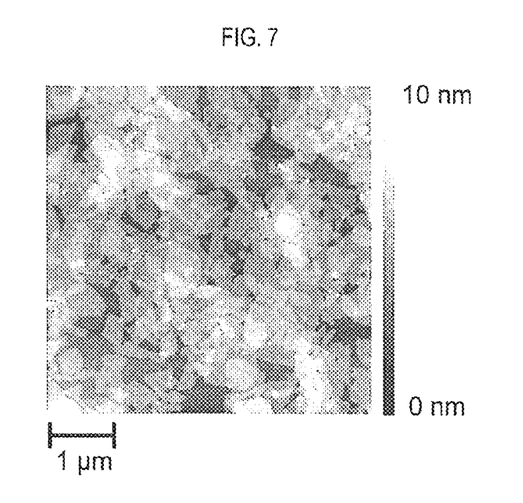
FIG. 7 is a SPM image showing the photocatalytic film formed by the method for the present invention.

FIG. 7 shows a measured SPM image. The average surface roughness at this time was Ra=1.2 nm.

As noted above, the film formed using a niobia nanosheet originally has very high smoothness. It was shown that the photocatalytic film formed on the glass by the method of the present invention thereby has high smoothness.

It is to be noted that the present invention is not limited to the above-described embodiment, and that the present invention can be carried out in various ways without departing from the scope of the invention.

What is claimed is:

1. A method for forming a photocatalytic film, wherein a photocatalytic film containing a niobium-alkali metal complex oxide is formed by forming and then firing at a temperature of 450° C. or higher, a layer containing niobia nanosheet on a surface of a base containing alkali metal without an undercoating film disposed between the layer containing the niobia nanosheet and the surface of the base;

wherein the niobia nanosheet comprises niobium oxide; and wherein the firing step comprises reacting the alkali metal and the niobium oxide to adhere the layer containing niobia nanosheet and the surface of the base.

2. The method for forming a photocatalytic film according to claim 1, wherein the layer containing the niobia nanosheet is formed by applying a coating agent containing the niobia nanosheet.

3. The method for forming a photocatalytic film according to claim 1, wherein the base containing alkali metal is soda-lime glass.

4. The method for forming a photocatalytic film according to claim 1, wherein the base containing alkali metal is a glassy film formed on a surface of a ceramic ware by glazing.

5. The method for forming a photocatalytic film according to claim 1, wherein the base containing alkali metal is a glassy film formed on a surface of a metal product by enameling.

6. The method for forming a photocatalytic film according to claim 1, wherein a firing temperature is 500-550° C.

7. A photocatalytic film formed by the method for forming a photocatalytic film set forth in claim 1.

8. The photocatalytic film according to claim 7, wherein an average surface roughness is equal to or lower than 5 nm.

9. A photocatalytic film-coated product including:

a base containing alkali metal; and the photocatalytic film set forth in claim 7 that is provided on a surface of the base.

* * * * *

UNITED STATES PATENT AND TRADEMARK OFFICE
CERTIFICATE OF CORRECTION

PATENT NO. : 9,012,354 B2
APPLICATION NO. : 12/526150
DATED : April 21, 2015
INVENTOR(S) : Christopher Cordonier et al.

Page 1 of 1

It is certified that error appears in the above-identified patent and that said Letters Patent is hereby corrected as shown below:

Title Page, item (73) in the Assignee:

Please insert -- Independent Administrative Institution National Institute for Materials Science, Ibaraki, Japan --.

Signed and Sealed this
Seventh Day of June, 2016

Michelle K. Lee
*Director of the United States Patent and Trademark Office*